United States Patent [19]

Hirata

[11] Patent Number: 5,688,134
[45] Date of Patent: Nov. 18, 1997

[54] IC CARD CONNECTOR APPARATUS

[75] Inventor: Hideyuki Hirata, Yokohama, Japan

[73] Assignee: Molex Incorporated, Lisle, Ill.

[21] Appl. No.: 623,268

[22] Filed: Mar. 28, 1996

[30] Foreign Application Priority Data

May 18, 1995 [JP] Japan ................................ 7-005734

[51] Int. Cl.⁶ ............................................. H01R 13/44
[52] U.S. Cl. ........................... 439/136; 439/159; 439/911
[58] Field of Search ................................... 439/131, 135, 439/136, 138, 152–160, 188, 911

[56] References Cited

U.S. PATENT DOCUMENTS

| | | | |
|---|---|---|---|
| 4,780,793 | 10/1988 | Ohtsuki | 439/136 |
| 5,035,633 | 7/1991 | Kobayashi et al. | 439/131 |
| 5,199,888 | 4/1993 | Condra et al. | 439/136 |
| 5,299,089 | 3/1994 | Lwee | 361/684 |
| 5,324,204 | 6/1994 | Lwee | 439/64 |
| 5,559,677 | 9/1996 | Buras, Jr. et al. | 439/138 |

*Primary Examiner*—J. J. Swann
*Attorney, Agent, or Firm*—Stacey E. Caldwell

[57] ABSTRACT

An IC card connector apparatus including a lock mechanism comprising: a box-type casing having card-receiving opening formed at one end thereof for inserting and ejecting an IC card; an electric connector mounted within said casing opposite said opening for mating with an edge of the IC card; and an eject mechanism including an eject rod disposed on one side of the casing. The connector apparatus further includes a shutter plate slidably mounted at one end of said insertion opening for preventing passage of the IC card therethrough when in a blocking position; and an ON-OFF switch operatively associated with said shutter plate to shut off the electrical connection between the IC card and the connector when the shutter plate is in an open position. One end of said shutter plate engages an end portion of said eject rod as a result of the slide movement of said shutter plate into its blocking position.

5 Claims, 3 Drawing Sheets

IC CARD CONNECTOR APPARATUS

FIELD OF THE INVENTION

The present invention relates to an IC card connector apparatus, and in particular an IC card connector apparatus equipped with an eject mechanism and a lock mechanism for controlling the insertion and ejection of an IC card.

BACKGROUND OF THE INVENTION

IC card connectors are typically constructed with a box-type casing or guide section formed of metal or plastic material which includes an IC card-receiving opening formed at one end thereof; an electric connector mounted within said casing opposite said opening for mating with an edge of an IC card; and an eject mechanism for ejecting the IC card, including an eject lever mounted on one side of said box-type casing. The eject mechanism may have some type of lock mechanism or safety device for preventing unwanted ejection of the IC card by inadvertent actuation of the eject mechanism particularly during electronic processing or functioning of the IC card. Such a lock mechanism prevent damages to the IC card and avoids interference with the transfer of the data.

Japanese Patent Laid-Open No. 64-59579 discloses an IC card connector having a mechanism in which a barrier or block is provided at an IC card insertion opening. The barrier and an eject lever (or "L"-shaped arm member) are coupled together through a linkage consisting of an arm secured to said barrier and a lever arm secured to said eject lever. According to the mechanism, moving the barrier one way causes movement of the eject lever to a position wherein the IC card is ejected, and moving the barrier another way causes movement of the eject lever to a position wherein an IC card may be fully inserted. However, the above-described prior art IC card connector has a complicated construction and an increased number of components, and therefore requires additional steps for assembly. Accordingly, such prior art IC card connector is relatively costly.

SUMMARY OF INVENTION

It is, therefore, an object of the present invention to solve the above problems of the prior art by providing an IC card connector apparatus which is simple in construction, needs only a basic number of components, can be easily assembled, and has a locking mechanism for controlling the insertion and ejection of an IC card.

It is another object of the present invention to provide an IC card connector apparatus of the type described above in which an ON-OFF switch is provided which serves to shut off the electrical connection or stop the data transfer of the IC card during insertion or ejection of the IC card.

In order to achieve these objects, the present invention provides an IC card connector in which a shutter plate is mounted adjacent an IC card insertion opening, and an eject arm and an ON-OFF switch are arranged to cooperate with the movement of said shutter plate.

According to one aspect of the present invention, an IC card connector apparatus comprises: a box-type casing having a card-receiving opening formed at one end thereof for inserting and ejecting an IC card; an electric connector mounted within said casing opposite said opening for mating with an edge of the IC card; an eject mechanism for ejecting the IC card from the connector including an eject rod disposed at one side of the casing; a shutter plate slidably mounted in said opening for preventing inadvertent ejection of the IC card wherein the end of said shutter plate is adapted to slidingly engage the end portion of said eject rod; and an ON-OFF switch mounted for cooperation with said shutter plate.

According to another aspect of the invention, an eject rod includes an operative block pivotally mounted on an end portion thereof, said operative block having a step portion which is engaged by a shutter plate when the operative block is pivotally moved to a position. The shutter plate is disposed with a side surface thereof facing an operation lever of an ON-OFF switch. According to the present invention, when the shutter plate is slidably moved away from the card-receiving opening, the shutter plate is disengaged from the end portion of the eject rod so that the eject rod can be manually operated and the ON-OFF switch turned OFF. Conversely, when the shutter plate is slidably moved to block the card-receiving opening, the shutter plate is engaged with the end portion of the eject rod so that the eject rod cannot be manually operated and the ON-OFF switch is turned ON.

The IC card connector apparatus of the present invention is relatively uncomplicated and low cost due to the simple construction and cooperation between the shutter plate and the eject rod. The ON-OFF switch, in cooperation with the slide movement of the shutter plate, further protects the IC card against electrical damage by stopping the electrical function of the card during ejection of the card.

BRIEF DESCRIPTION OF DRAWINGS

The invention, together with its objects and the advantages thereof, may be best understood by reference to the following description taken in connection with the accompanying drawings in which.

DETAILED DESCRIPTION OF THE PREFERRED EMBODIMENT

Figure 1:
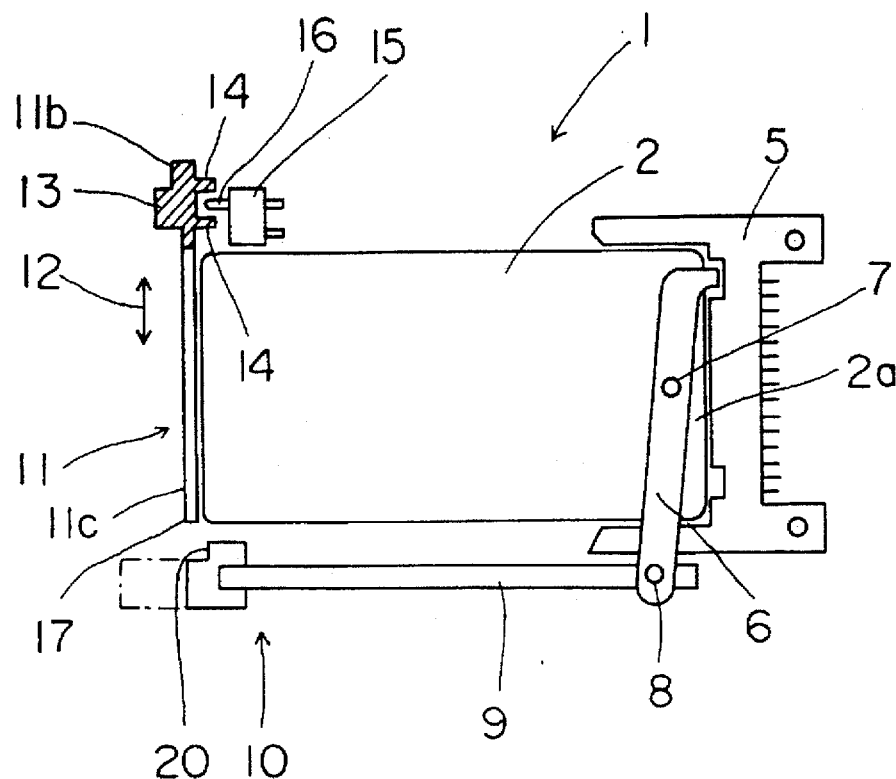
FIG. 1 is a plan view of the main components of an IC card connector according to the present invention.
Figure 2:
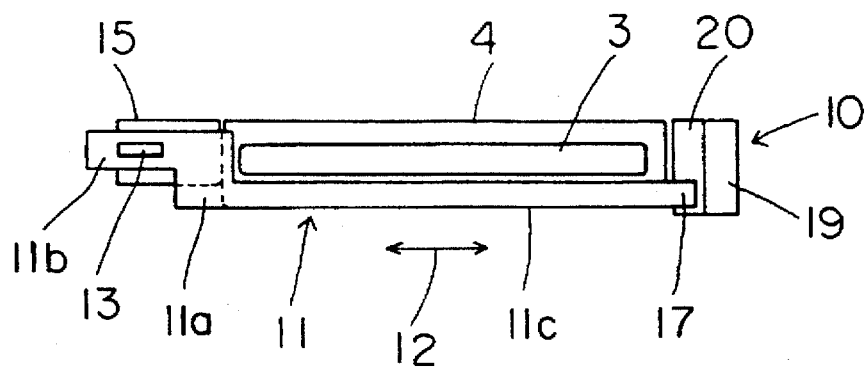
FIG. 2 is a front view showing a card-receiving opening of the IC card connector according to the present invention.
Figure 3:
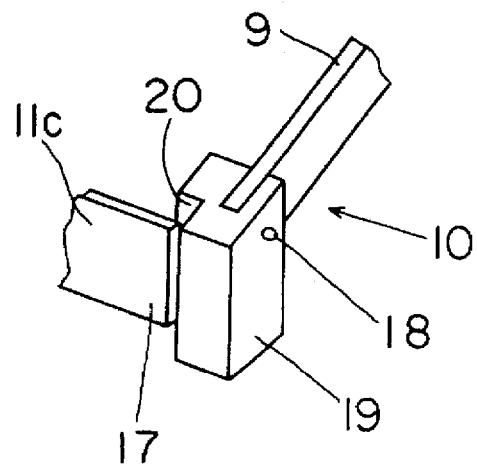
FIG. 3 is a perspective view of an eject lever with an end thereof being at a vertical or downwardly extended position.
Figure 4:
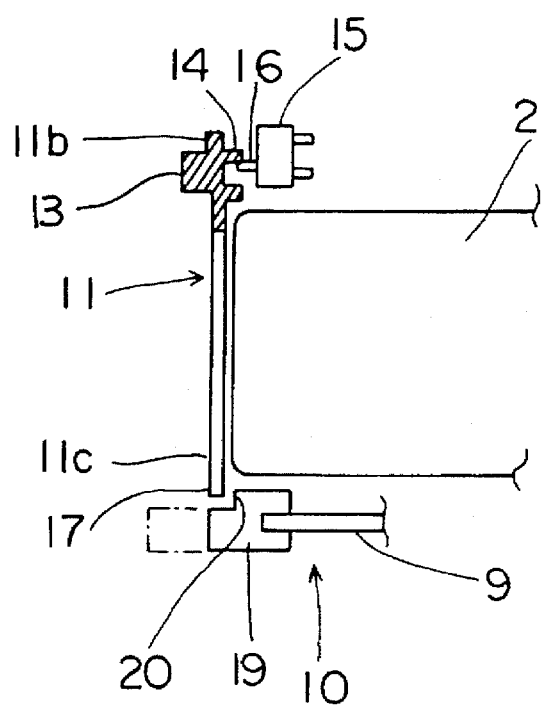
FIG. 4 is a plan view of the main components of the IC card connector when a shutter plate partially closes the insertion opening.
Figure 5:
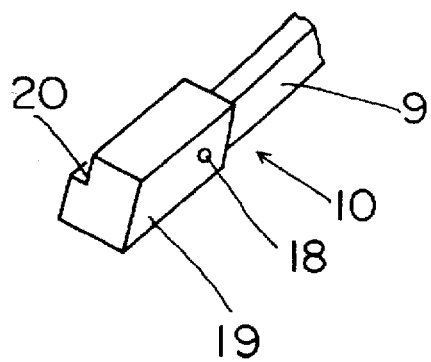
FIG. 5 is a perspective view of an eject lever with an end thereof being at a horizontal or outwardly extended position.

FIGS. 1–6 show an IC card connector 1 according to an embodiment of the present invention. Looking to FIGS. 2 and 6, IC card connector 1 comprises a box-type casing 4 formed of metal or plastic material having a card-receiving opening 3 at one end thereof for accommodating an IC card 2, and an electric connector 5 mounted in a rear portion of the casing 4 opposite said card-receiving opening 3 for mating with an edge 2a of IC card 2. An eject lever 6 is pivotally mounted to a top wall 4a of casing 4 and pivotally moves about a fulcrum 7. FIGS. 1 and 4 illustrate the invention with out the box-type casing or guide 4 for facilitating understanding the invention.

Figure 6:
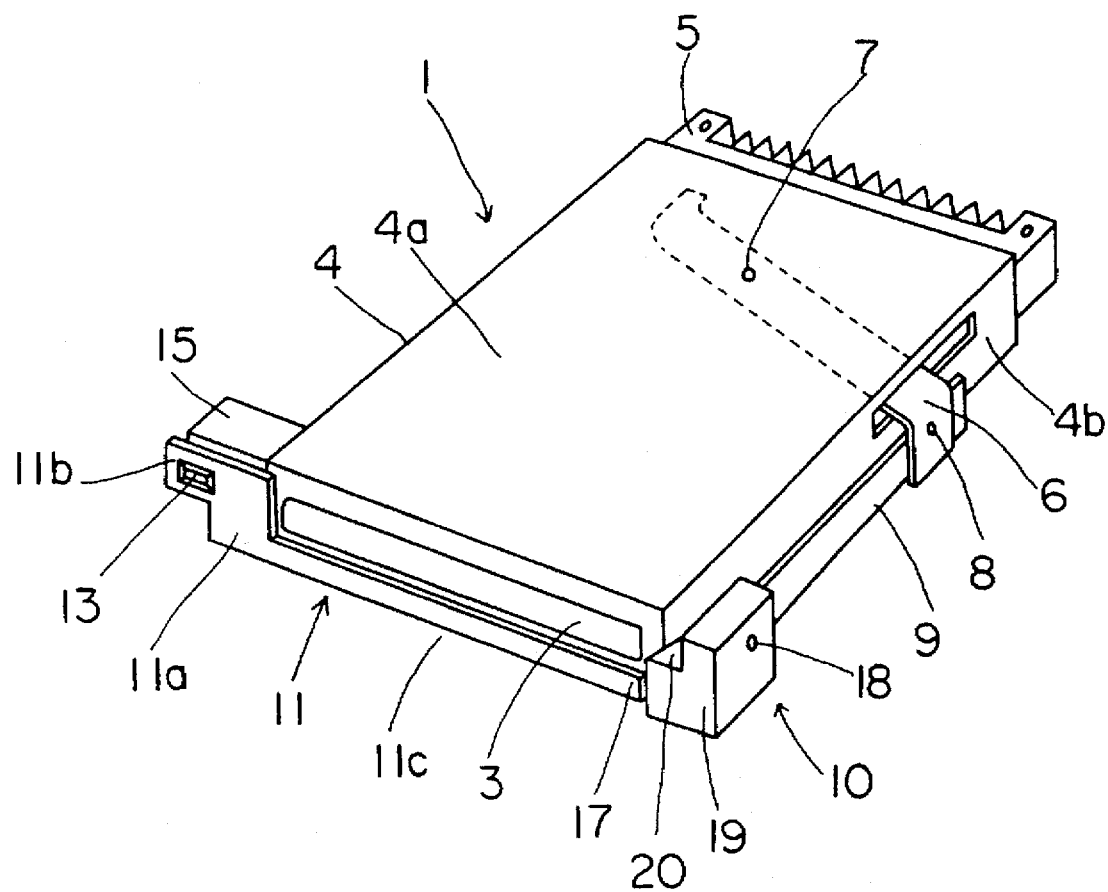
FIG. 6 is a perspective view of the entire IC card connector of FIG. 1.

One end of eject lever 6 is adapted to engage edge 2a of IC card 2 at one side thereof when the card is inserted into casing 4. An eject rod 9 is disposed along a side wall 4b of casing 4 (FIG. 6). One end of eject rod 9 is coupled to an end of eject lever 6 by a pin 8 and the opposite end 10 of eject rod 9 is positioned adjacent card-receiving opening 3. Eject lever 6 and eject rod 9 form an eject mechanism for ejecting IC card 2 from electric connector 5.

A shutter plate 11 is slidably mounted at the front end of card-receiving opening 3. The direction of the slide movement is indicated by arrow 12 in FIG. 1. As seen in FIG. 2, shutter plate 11 has a stepped-shape, and includes a vertical blocking portion 11a, horizontal operative portion 11b, and a horizontal sliding portion 11c, all integrally formed. Shutter plate 11 is operated so that when it is slidably moved, blocking portion 11a partially blocks insertion opening 3 on one side thereof to prevent insertion or ejection of a card 2.

Looking now to FIG. 4, operative portion 11b of shutter plate 11 has a knob 13 formed on a front surface thereof and two parallel latch projections 14 on a rear surface thereof. An ON-OFF switch 15 is mounted at a position opposite the rear surface of operative portion 11b adjacent to latch projections 14. ON-OFF switch 15 cooperates with operative portion 11b through an operation lever 16 positioned between latch projections 14. When the shutter plate 11 is moved such that blocking portion 11a partially closes insertion opening 3, the ON-OFF switch 15 is turned ON. Conversely, when the shutter plate 11 is slid back to open insertion opening 3, the ON-OFF switch 15 is turned OFF.

The sliding portion 11c of shutter plate 11 extends beyond the side wall of casing 4 so that an end 17 of sliding portion 11c directly faces end portion 10 of eject rod 9 when the shutter plate 11 is slidably moved. An operative block 19 is pivotally mounted to end portion 10 of eject rod 9 by a pin 18 so that block 19 can pivot between a horizontal and a vertical position. A step portion 20 is formed in the block. When the block is pivoted to the vertical position as shown in FIGS. 3 and 4, end 17 of sliding portion 11c is received in step portion 20 for interengagement therebetween.

More specifically, when shutter plate 11 is slidably moved to where blocking portion 11a partially closes card-receiving opening 3, end 17 of sliding portion 11c engages step portion 20 of operative block 19, and the ON-OFF switch 15 is turned ON by way of latch projection 14 of operative portion 11b.

Similarly, when shutter plate 11 is moved back from card-receiving opening 3, end 17 of sliding portion 11c is disengaged from step portion 20 of block 19, and the ON-OFF switch 15 is turned OFF.

According to the IC card connector as described above, in order to insert IC card 2, shutter plate 11 is slidably moved so that blocking portion 11a is moved away from insertion opening 3. At such time, ON-OFF switch 15 is turned OFF, as described above. Therefore, any interruption of data transfer or application of unintended or inadvertent voltage to IC card 2 is avoided.

IC card 2 is then inserted into casing 4 through card-receiving opening 3 and edge 2a of IC card 2 is mated to electrical connector 5 to complete the connection between the circuit of the IC card and the connector. Next, shutter plate 11 is slidably moved so that blocking portion 11a partially closes card-receiving opening 3. At this time, the ON-OFF switch 15 is turned ON and the fully inserted card cannot be ejected. It is noted here that before the slide movement of the shutter plate 11, operative block 19 on end portion 10 of eject rod 9 is pivotally moved to the vertical position relative to eject rod 9. Therefore, end 17 of sliding portion 11c of shutter plate 11 is engaged with step portion 20 of block 19.

Because card-receiving opening 3 of casing 4 is blocked by the shutter plate 11 and end 17 of shutter plate 11 is engaged with end portion 10 of eject rod 9, the IC card is blocked by the eject mechanism. This thus prevents inadvertent ejection of the IC card.

In order to eject the IC card from the connector, shutter plate 11 is slidably moved in the reverse direction to unblock card-receiving opening 3. At such time, ON-OFF switch 15 is again turned OFF. Therefore, IC card 2 is electrically disconnected so that the IC card is protected against damage due to any inadvertent application of abnormal voltage. Once card-receiving opening 3 is opened, end 17 of sliding portion 11 of shutter plate 11 is disengaged from operative block 19, and operative block 19 is pivotally moved to the horizontal position. Thereafter, operative block 19 and eject rod 9 may be pushed in the longitudinal direction so that eject lever 6 pivots about fulcrum 7 to push the IC card in the direction of ejection and to disconnect it from electrical connector 5. Accordingly, IC card 2 partially projects from the card-receiving opening 3 so that it can be manually extracted.

It is apparent from the foregoing that the present invention provides an IC card connector which is simple in construction, has few components and which is easily assembled. Furthermore, due to the provision of the ON-OFF switch in cooperation with the slide movement of the shutter plate, the IC card is protected against electrical damage of data interference during insertion and ejection of the card.

It will be understood that the invention may be embodied in other specific forms without departing from the spirit or central characteristics thereof.

I claim:

1. An IC card connector apparatus comprising:
   a casing having a card-receiving opening formed at one end thereof for the passage of an IC card therethrough;
   an electric connector mounted at the other end of said casing for electrically coupling to an edge of the IC card;
   an eject mechanism for removing the IC card from the connector, the eject mechanism including an eject rod disposed generally alongside the casing; and
   a shutter plate slidably mounted at the one end of the casing,
   wherein said shutter plate is movable between a blocking position wherein a portion of the card-receiving opening is blocked to prevent insertion and ejection of the IC card and an open position wherein the IC card may pass therethrough
   and wherein the shutter plate includes a blocking portion which blocks the portion of the card-receiving opening when the shutter is in the blocking position, an operative portion located on one side of the blocking portion, and an elongated sliding portion on the other side of the blocking portion, each of the blocking portion, operative portion and elongated sliding portion being integrally formed with the shutter plate.

2. An IC card connector apparatus according to claim 1 further comprising a switch operatively associated with said shutter plate for shutting off the electrical connection between the IC card and the electrical connector when the shutter plate is in its open position.

3. An IC card connector apparatus according to claim 2 wherein said shutter plate includes a surface having projections which cooperate with said switch such that when the shutter plate is in its blocking position the switch is turned on by the projections and when the shutter plate is in its open position the switch is turned off by the projections.

4. An IC card connector apparatus according to claim 1 wherein said eject rod includes an operative block pivotally mounted on an end portion of the rod for movement between a horizontal and a vertical position.

5. An IC card connector apparatus according to claim 4 wherein the elongated sliding portion of the shutter plate extends substantially entirely across the card-receiving opening and the operative block includes a step portion engageable with an end of the sliding portion of the shutter plate when the operative block is in its horizontal position and the shutter plate is in its blocking position.

* * * * *